United States Patent [19]

Fetcenko et al.

[11] Patent Number: 4,888,082
[45] Date of Patent: Dec. 19, 1989

[54] APPARATUS FOR ADHESIVE TRANSFER

[75] Inventors: Raymond M. Fetcenko, Elyria, Ohio; Jan Wydro, Lilburn, Ga.; Ralph P. Zuponcic, Hudson, Ohio

[73] Assignee: Nordson Corporation, Westlake, Ohio

[21] Appl. No.: 926,006

[22] Filed: Oct. 31, 1986

[51] Int. Cl.⁴ .................. B29B 15/00; B44C 1/16; B05C 1/00; B05C 1/14
[52] U.S. Cl. ...................... 156/500; 156/231; 156/578; 118/239; 118/257; 425/105
[58] Field of Search ............... 156/230, 231, 246, 240, 156/241, 247, 249, 344, 588, 500, 234, 578; 427/256; 118/209, 232, 233, 239, 257; 425/105

[56] References Cited

U.S. PATENT DOCUMENTS

| | | | |
|---|---|---|---|
| 3,418,188 | 12/1968 | Hogg et al. | 156/246 |
| 3,853,663 | 12/1974 | McGlashen | 156/304 |
| 3,884,749 | 5/1975 | Pankoke | 156/246 |
| 3,989,569 | 11/1976 | Newman | 156/234 |
| 4,003,333 | 1/1977 | Eichorn et al. | 118/257 |
| 4,070,987 | 1/1978 | Gross et al. | 118/257 |
| 4,077,831 | 3/1978 | Snellman et al. | 156/578 |
| 4,515,103 | 5/1985 | Greig | 118/257 |
| 4,556,627 | 12/1985 | Sullivan | 156/241 |
| 4,588,470 | 5/1986 | Abegglea | 156/578 |

FOREIGN PATENT DOCUMENTS 1132704  7/1962  Fed. Rep. of Germany .
1167206  7/1958  France .
2154906  9/1985  United Kingdom .

OTHER PUBLICATIONS

Nordson (advertisement) "Hot Paste Speeds Core Assembly", Sep. 1977.
The Replicast CS Process by Ashton et al., Scrata No. 64, pp. 1–11, Mar., 1984.
Patent Abstracts of Japan, vol. 10, No. 375 (M–545)(2432), Dec. 13, 1986 & JP, A, 61169134 (Toyota Motor Corp.) Jul. 30, 1986.

Primary Examiner—Michael W. Ball
Assistant Examiner—Louis Falasco
Attorney, Agent, or Firm—Wood, Herron & Evans

[57] ABSTRACT

A method and apparatus for applying hot melt adhesive to the parting surfaces of sections of a foam pattern employed in the lost foam metal casting process includes an adhesive applicator operable to dispense a layer of adhesive in a desired pattern onto a transfer surface. The parting surface of a section of a foam pattern is then brought into engagement with the transfer surface so that at least a portion of the adhesive adheres to the parting surface for assembly with a mating section of the foam pattern. The adhesive remaining on the transfer surface after engagement with the parting surface is scraped off and a new layer of adhesive applied in preparation for another section of the foam pattern.

7 Claims, 3 Drawing Sheets

APPARATUS FOR ADHESIVE TRANSFER

BACKGROUND OF THE INVENTION

This invention relates to adhesive transfer devices and methods, and, more particularly, to a method and apparatus for applying hot melt adhesive to the parting surfaces or joints of patterns formed of foam material used in metal casting processes.

Thousands of tons of metal castings have been produced by a cavityless casting method employing a foam pattern which is not removed from the mold prior to pouring of the molten metal and evaporates before the metal cools. One process of this type is known as the full mold or lost foam process in which a mold pattern is made from a foam material such as expanded polystyrene. A ceramic wash is applied to the surface of the foam polystyrene pattern, and then the pattern is embedded in dry, unbonded sand which is densely compacted around the foam pattern. A runner system, made from the same polystyrene material, is Molten metal is poured into the downsprue and flows into the foam pattern. The downsprue, runner system and foam pattern all vaporize but are immediately replaced by the molten metal so that the mold is always full. The sand is prevented from collapsing in on the space which was occupied by the foam pattern by a combination of gas pressure built up as the foam material vaporizes, the refractory coating or ceramic wash applied to the pattern and the rapid replacement of the pattern by the molten metal. The metal solidifies forming a replica of the foam pattern shape.

Aluminum, yellow metal, iron and some steel castings can be produced by the lost foam casting method described above with little change to their chemical content. However, the polystyrene foam contains a high percentage of carbon which can be absorbed by the casting. As a result, castings using low carbon content steel cannot be acceptably produced by the lost foam process. These types of castings are often produced by a ceramic shell process in which a foam pattern is coated with a thin layer of ceramic material after which the foam material is vaporized leaving a ceramic shell. The ceramic shell is then embedded in dry sand in a casting operation similar to that described above.

The foam patterns employed in the lot foam and ceramic shell processes described above are formed by blowing polystyrene beads into a tool through which steam is passed to cause the beads to expand so that they flatten against the tool surface and adhere to one another. After cooling, each solid section of the foam pattern is ejected from the tool for assembly. Particularly in patterns of complex shape, several individual sections of the foam pattern are formed in tools and then joined together along their joints or parting surfaces by adhesives to form the finished pattern.

Attachment of mating parts or sections of the foam pattern is an important aspect of the lost foam casting and ceramic shell processes. The parting surfaces of the foam pattern must be accurately assembled to obtain a casting with an acceptable surface finish and good dimensional accuracy. Voids between the parting surfaces must be eliminated to prevent sand, and the ceramic or refractory material which coats the foam pattern in the ceramic shell process, from entering the space intended for the molten metal. If sand or refractory material is permitted to enter the voids, the surface finish on the casting may be poor. In addition, the adhesive employed to connect the mold parts must be placed on the parting surfaces so that no seepage occurs on the outside of the foam pattern which would create roughness in the surface finish of the molded part.

It has been one practice in the prior art to join parting surfaces of foam patterns by applying hot melt adhesive directly to such surfaces either by hand-held adhesive guns or by adhesive guns manipulated with a robot arm. Manual application of the hot melt adhesive is relatively inefficient and highly labor-intensive adding substantially to the overall cost of producing the foam patterns. While the application of hot melt adhesive by a robot manipulated gun increases efficiency, the cost of such equipment is often prohibitive except in applications where a large number of patterns are to be manufactured.

Another disadvantage with applying hot melt adhesive directly to the parting surfaces of foam patterns, either manually or with a robot arm, is that it is exceedingly difficult to accurately apply the adhesive to intricate patterns. If the adhesive is applied too close to the edge of the parting surfaces of mating sections of the pattern, the adhesive can be squeezed from between the parting surfaces when the pattern sections are assembled and seep onto the exterior of the foam pattern. This produces a rough surface finish on the cast metal part.

One attempt to improve upon the prior methods of applying hot melt adhesive directly to the parting surfaces of a section of a foam pattern is found in U.K. Pat. No. 2,154,906. In this patent, a glue plate is submerged in a hot melt adhesive bath and then raised upwardly into contact with the parting surface of one section of a foam pattern. The top surface of the glue plate is formed with a raised pattern corresponding to the desired adhesive pattern to be applied to the parting surface of the foam section. The foam section is then transferred into engagement with a second foam section, having a mating parting surface, for assembly.

This method of application of adhesive onto the parting surfaces of the sections of a foam pattern eliminates some of the problems in the prior art described above. It is easier to apply adhesive to intricate patterns with this method, and a more even coating is obtained on the parting surfaces of the sections of the foam pattern. However, problems are also created. The apparatus disclosed in the U.K. patent is relatively complex. A mechanism must be provided which extends into the adhesive bath to raise and lower the glue plate without causing leakage. In order to alter adhesive patterns for different sections of the foam pattern, the entire glue plate must be replaced with another glue plate having the desired surface configuration.

Additionally, some problems have been experienced in the prior art with compressing hot melt adhesives after application to the parting surfaces of foam patterns to achieve a uniform layer of adhesive on such parting surfaces. The relatively high viscosity, high surface tension, and quick setting time of hot melt adhesives all combine to prevent the adhesive from readily spreading when the adhesive is applied as a liquid to the substrate. Instead of spreading, the liquid can set up as a thick bead on the structure. Even if the parting surfaces of connecting sections of the foam pattern are quickly compressed after the hot melt adhesive is applied, the adhesive is sometimes difficult to spread resulting in an uneven layer which can reduce the strength of the joint. In addition, conventional hot melt adhesives have a relatively high specific heat in the molten state, which can cause wavering or buckling of the joining surfaces of the foam pattern when applied thereto. If the joints in the foam patterns are distorted, the dimensions of the casting produced may not fall within acceptable tolerances.

SUMMARY OF THE INVENTION

It is therefore among the objects of this invention to provide a method and apparatus for the application of adhesive to the parting surfaces of adjoining sections of expanded polystyrene foam patterns for producing metal castings which is relatively simple and inexpensive, which provides for accurate placement of adhesive on intricate patterns, and which provides for the application of a uniform layer of adhesive upon the parting surfaces of the foam pattern.

These objectives are accomplished in a method and apparatus which is predicated upon the concept of applying melt adhesive onto the parting surfaces of expanded polystyrene foam sections by first dispensing the adhesive from at least one adhesive gun in a desired pattern onto predetermined, selected areas of a transfer surface, and then contacting the parting surface of the foam section with the adhesive.

In a presently preferred embodiment, a melt adhesive layer is dispensed by adhesive guns onto a transfer surface, which is preferably heated and formed of a non-stick material or a non-stick coating such as Teflon coating. The parting surface of one section of the foam pattern is then moved into engagement with the adhesive on the transfer surface, either manually or mechanically, so that at least a portion of the adhesive adheres to the parting surface of the foam pattern section. The parting surface is then joined with a mating parting surface of another section of the foam pattern allowing the adhesive to set.

More specifically, in one presently preferred embodiment, the apparatus herein includes a flexible, endless belt carried by a pair of rollers which is formed with a non-stick transfer surface along at least a portion of its length. The flexible belt is movable to an application station having an adhesive gun mounted thereabove which is operable to dispense a layer of adhesive in a desired pattern upon the non-stick transfer surface of the belt. The adhesive layer is moved with the belt to an adhesive transfer station which includes a support plate formed with a top surface mounted immediately beneath the flexible belt. The top surface conforms to the shape of the parting surface of the section of the foam pattern to receive adhesive.

Preferably, the support plate includes means for drawing the flexible belt upon its top surface, such as a suction device, so that the transfer surface of the flexible belt lies directly upon the top surface of the support plate. The parting surface of the section of the foam pattern is then manually or mechanically moved into engagement with the transfer surface on the mating top surface of the support plate. In this manner, an even coating of adhesive is applied to the parting surface of the section of the foam pattern even where the parting surface has an intricate configuration including ridges, valleys or other contoured shapes.

The flexible belt is then movable to a scraper station in which a scraper engages the transfer surface of the belt and removes any adhesive remaining after contact with the foam section. A container or trough mounted at the scraper station receives the adhesive removed from the belt and either recirculates it to the adhesive gun or returns it to a storage container. At the same time, the parting surface of the section of the foam pattern is moved into engagement with a mating section of the foam pattern.

In another embodiment of this invention, a transfer surface is formed on a fixed plate which preferably includes means for maintaining the transfer surface at an elevated temperature. A carriage, movable with respect to the transfer surface, carries a scraper and an adhesive applicator device such as an adhesive gun having a nozzle formed with one or more discharge orifices. Initially, the adhesive gun is operated to lay down a layer of adhesive in a desired pattern onto the transfer surface as the carriage moves the scraper and adhesive gun in one direction relative to the transfer surface. The scraper and gun are then returned by the carriage to their initial position. At this time, the parting surface of a section of a foam pattern is brought into engagement with the adhesive on the transfer surface either manually or mechanically. A portion of the adhesive on the transfer surface adheres to the parting surface of the foam pattern section which is then removed for assembly with a mating section of the foam pattern.

Thereafter, the scraper is lowered onto the transfer surface. The carriage advances the scraper ahead of the gun so that any adhesive remaining on the transfer surface after engagement with the foam pattern section is removed by the scraper. At the same time, the adhesive gun lays down a new layer of adhesive behind the scraper. The scraper is then moved to a raised position above the transfer surface, and the carriage returns both the gun and scraper to their initial position relative to the transfer surface.

Preferably, collection means in the form of a trough is provided in the transfer surface in alignment with the scraper so that the adhesive scraped from the transfer surface is deposited into the trough for reuse. The adhesive collected in the trough, which is preferably heated, is either returned to the adhesive gun or transferred to a storage container for reuse.

In another aspect of this invention, the adhesive guns utilized to dispense adhesive in each of the embodiments described above are adapted to be supplied with hot melt adhesive in the form of a cellular foam rather than as a conventional non-foamed adhesive. The method of forming foamed adhesive is described in detail in U.S. Pat. No. 4,059,466, assigned to the assignee of this invention.

It has been discovered that hot melt adhesive in the form of a cellular foam has several properties which provide a substantial improvement over hot melt adhesive in the non-foamed state for use in bonding the parting surfaces of sections of foam patterns. Foamed hot melt adhesive flows much better than non-foamed hot melt adhesive and thus it is easier to obtain an even layer on the parting surfaces of the sections of the foam patterns, and to better fill any voids formed by the expanded polystyrene. In addition, foamed hot melt adhesive sets up faster and is less likely to cause damage to the expanded polystyrene than non-foamed hot melt adhesive because of its lower specific heat. Hot melt adhesive in cellular foam form also exhibits improved resistance to sagging and drooping which helps resist seeping or running of the adhesive between the parting surfaces of the sections of the foam patterns, particularly in patterns having intricate, contoured parting surfaces.

DESCRIPTION OF THE DRAWINGS

The structure, operation and advantages of a presently preferred embodiment of this invention will become further apparent upon consideration of the following description, taken in conjunction with the accompanying drawings, wherein.

DETAILED DESCRIPTION OF THE INVENTION

Figure 1:
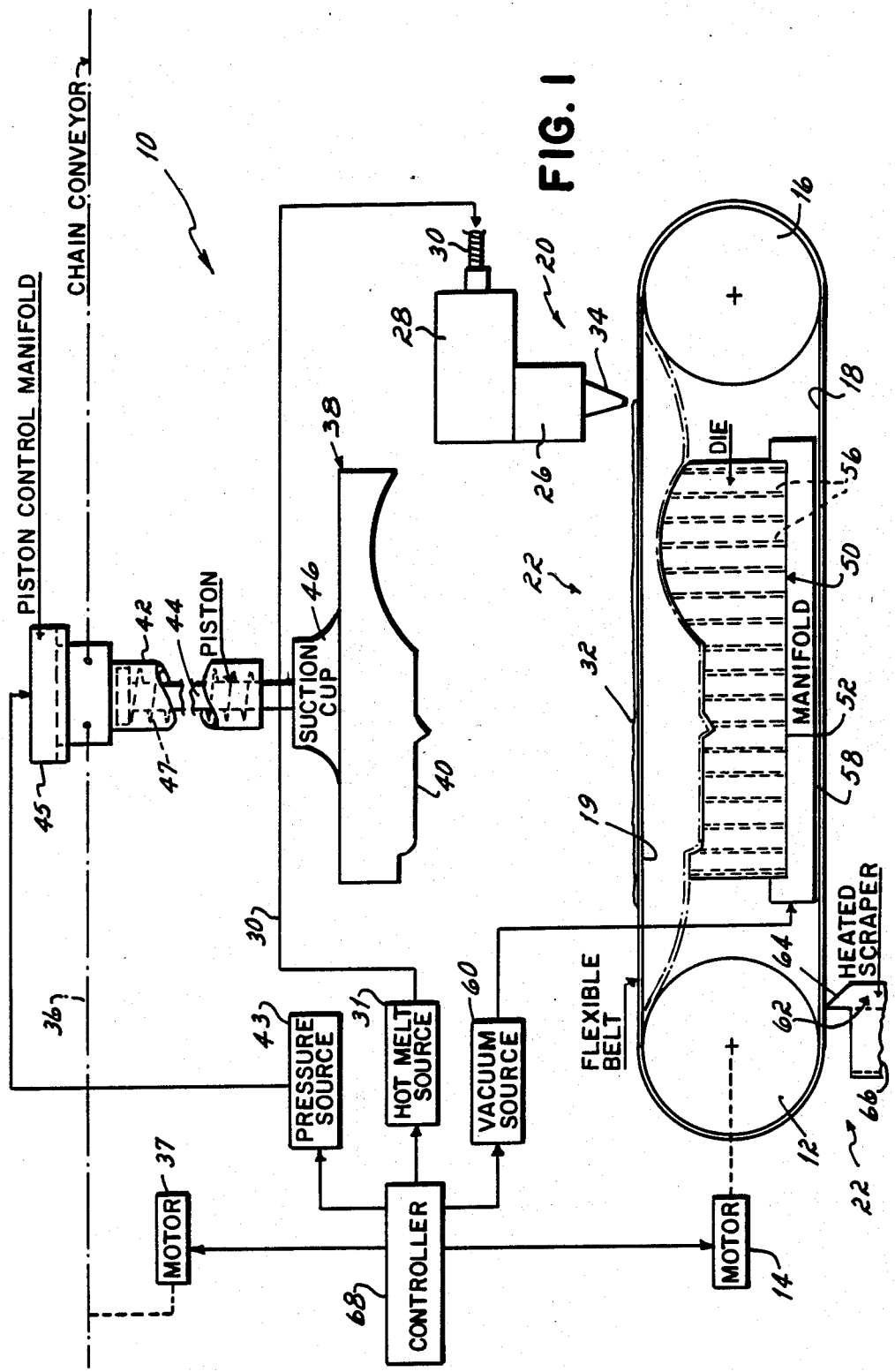
FIG. 1 is a schematic front view of one presently preferred embodiment of this invention employing a movable belt.

Referring now to FIG. 1, one presently preferred embodiment of the adhesive transfer system of this invention is illustrated. Adhesive transfer system 10 includes a drive roller 12 rotatably driven by a motor 14, and a freewheeling idler roller 16 spaced from the drive roller 12. An endless, flexible belt 18 extends between the rollers 12, 16 for movement between an adhesive application station 20, an adhesive transfer station 22, and an adhesive scraping station 24. Preferably, the flexible belt 18 has an outwardly facing transfer surface 19 formed of a material or having a coating which does not stick to hot melt adhesive.

Referring to the righthand portion of FIG. 1, an adhesive gun 26 carried by a support 28 is mounted immediately above the flexible belt 18 at the adhesive applicator station 20. A supply line 30 from a source 31 of hot melt adhesive in the foamed or non-foamed state is connected to the adhesive gun 26 through the support 28. A layer 32 of adhesive is dispensed onto the transfer surface 19 of the flexible belt 18 through a nozzle 34 mounted to the gun 26 which is formed with one or more discharge orifices (not shown). The number and configuration of the discharge orifices in the nozzle 34 is chosen to obtain the pattern of adhesive required to cover the parting surface 40 of a particular foam section 38 of a foam pattern, as described below.

The belt 18 then carries the layer 32 of adhesive to the adhesive transfer station 22. At the same time, an overhead conveyor 36 driven by a motor 37 moves a foam section 38 to the adhesive transfer station 22 immediately above the flexible belt 18. The foam section 38 is preferably formed of an expanded polystyrene foam material and forms a part or section of the overall foam pattern for metal casting using the lost foam or ceramic shell processes described above. In the embodiment shown in FIG. 1, the foam section 38 has an irregularly shaped parting line or surface 40 which is connected to a mating surface of another foam section (not shown).

As illustrated schematically in FIG. 1, the overhead conveyor 36 mounts a cylinder 42 having a movable piston 44 which carries a vacuum cup 46 at its lower end. The vacuum cup 46 engages the foam section 38 and supports it during transit along the overhead conveyor 36 and during the adhesive transfer operation described below. The cylinder 42 is connected to a control manifold 45 carried by the overhead conveyor 36 which is supplied by a source 43 of pressurized fluid. The cylinder is operable to move the piston 44 toward the flexible belt 18 during the adhesive transfer operation, and a spring 47 normally biases the piston to a raised position.

A support plate 50 is also located at the adhesive transfer station 22 which is mounted beneath the flexible belt 18. The support plate 50 includes a bottom surface 52, and a top surface 54 formed in substantially the identical shape as the parting surface 40 of the mold part 38. In a presently preferred embodiment, the support plate 50 is formed with a plurality of throughbores 56 extending from the bottom surface 52 to the top surface 54. A manifold 58, operatively connected to a vacuum source 60, is mounted at the bottom surface 52 to create a suction at the top surface 54 of the support plate 50. Preferably, the support plate 50 is provided with heating coils or similar heating devices (not shown) to maintain the top surface 54 at an elevated temperature.

A heated scraper 62 having a scraper edge 64 is mounted along the lower run of the flexible belt 18 immediately downstream of a collector 66. The scraper edge 64 of scraper 62 contacts the flexible belt 18 to remove any of the adhesive layer 32 remaining on the transfer surface 19 after the adhesive transfer operation, described below, and deposits such remaining adhesive into the collector 66. The collector 66 recirculates the adhesive directly to the adhesive gun 26 or returns the adhesive to a container (not shown).

Referring now to FIGS. 4–8, the operation of the adhesive transfer system 10 is shown in sequence. The overall system operation is controlled by an electronic or pneumatic controller 68. The controller 68 per se forms no part of this invention and is therefore not described in detail herein.

Figure 4:
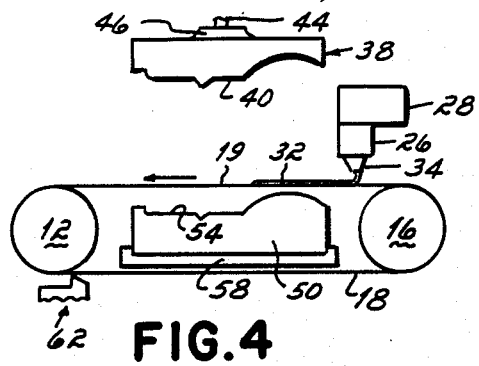
FIGS. 4–8 are schematic views of the sequential method of operation of the apparatus illustrated in FIGS. 1 and 2.

Initially, as shown in FIG. 4, the controller 68 operates the adhesive gun 26 which applies a layer 32 of melt adhesive in the desired pattern onto the transfer surface 19 of flexible belt 18 at the adhesive applicator station 20. The controller 68 also activates motor 14 during the adhesive application operation to move the flexible belt 18 beneath the stationary gun 26.

The controller 68 activates the motor 14 for a sufficient period of time to move the layer 32 of adhesive to the adhesive application station 22 immediately above the top surface 54 of the support plate 50. Simultaneously, the controller 68 causes the conveyor motor 37 to operate the overhead conveyor 36 which moves a foam section 38 to the adhesive transfer station 22 so that its parting surface 40 is in alignment above the top surface 54 of the support plate 50.

Figure 5:
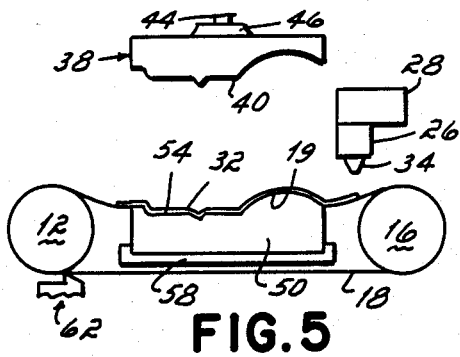
Figure 6:
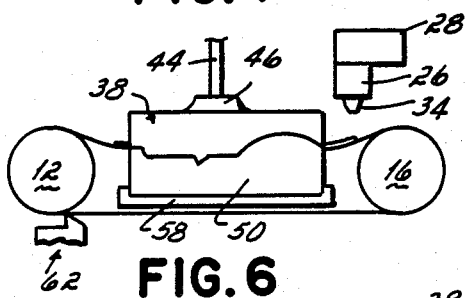

The controller 68 then activates the vacuum source 60 as shown in FIG. 5 to create a suction force at the top surface 54 of support plate 50 via bores 56 to draw the transfer surface 19 of flexible belt 18 and the adhesive layer 32 it supports onto the top surface 54. The belt 18 is sufficiently flexible to assume the shape of the top surface 54, which, as mentioned above, is substantially identical to the shape of the parting surface 40 of foam section 38.

Figure 7:
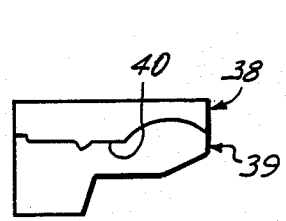

The controller 68 next activates the pressure source 43 and control manifold 45 which operate the cylinder 42. The piston 44 is moved downwardly to place the parting surface 40 of mold part 38 into engagement with the adhesive layer 32 on the transfer surface 19 of the belt 18 which is held by suction atop the top surface 54 of support plate 50. See FIG. 6. At least a portion of the adhesive layer 32 adheres to the parting surface 40 of mold part 38 and remains there as the controller 68 reverses the operation of cylinder 42 and returns the foam section 38 to its initial position. The foam section 38 is then joined with a mating foam section 39 of the foam pattern as shown in FIG. 7.

Figure 8:
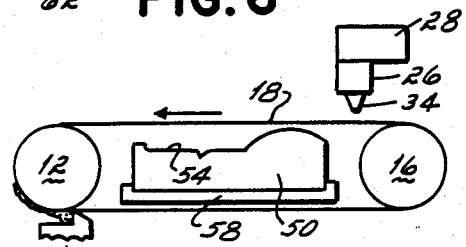

Referring to FIG. 8, some of the adhesive layer 32 remains on the flexible belt 18 after engagement with the foam section 38. The controller 68 activates the motor 14 to move the transfer surface 19 of the belt 18 to the adhesive scraping station 24 where the scraper edge 64 removes any remaining adhesive from the transfer surface 19. The excess adhesive is scraped into the collector 66, which is preferably heated, and then either recirculated to the gun 26 at the adhesive applicator station 20 or returned to a container (not shown).

Figure 2:
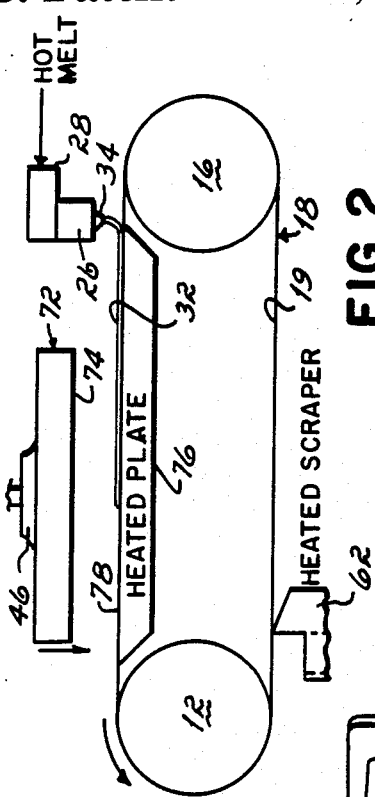
FIG. 2 is a schematic front view of an alternative embodiment of the invention shown in FIG. 1.

Referring now to FIG. 2, an adhesive transfer system 70 is illustrated which is a modification of adhesive transfer system 10. Common elements of systems 10 and 70 are given the same reference numbers in FIGS. 1 and 2.

The primary difference between the adhesive transfer system 70 and the one shown in FIG. 1 is that system 70 is intended to accommodate foam sections 72 having an essentially planar parting surface 74. In this embodiment, a support plate 76 having a planar top surface 78 is mounted at the adhesive transfer station 22 beneath the flexible belt 18. The support plate 76 preferably includes heating coils (not shown) to maintain the planar top surface 7 at an elevated temperature.

A foam section 72 is moved into engagement with the transfer surface 19 of belt 18 in the same manner as described above to effect transfer of a portion of an adhesive layer 32 onto the planar parting surface 74 of the foam section 72. No vacuum is required to draw the flexible belt 18 against the planar top surface 78 of support plate 76 because of the flat or planar configuration of parting surface 74. The support plate 76 merely provides a bearing surface for support of the transfer surface 19 of flexible belt 18 upon engagement with the mold part 72.

Figure 3:
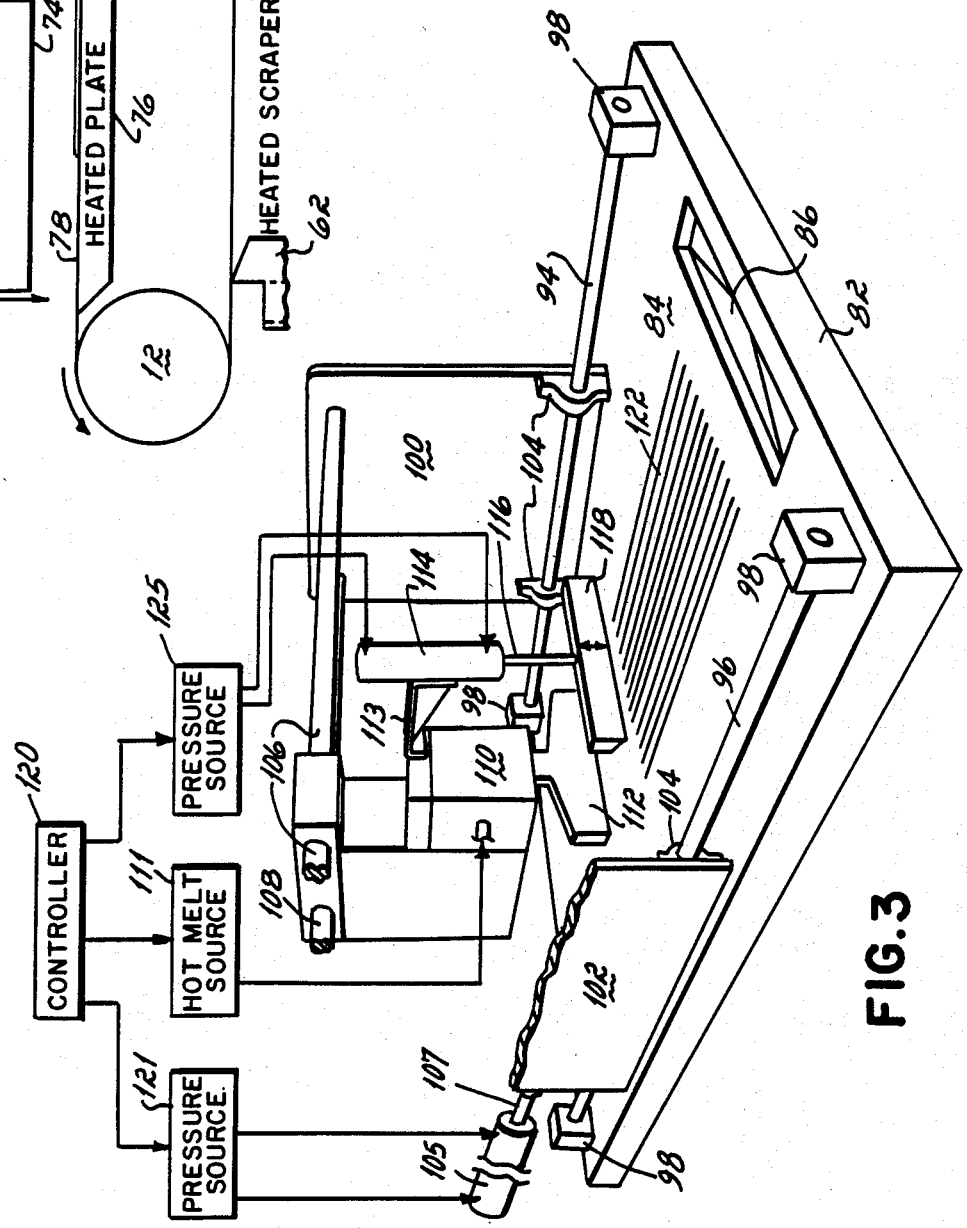
FIG. 3 is an isometric view of a further embodiment of this invention employing a fixed transfer surface and movable scraper and adhesive applicator.

Another embodiment of this invention is illustrated in the adhesive transfer system 80 shown in FIG. 3. The system 80 includes a fixed, heated plate 82 having an upper, transfer surface 84 preferably formed of a material or having a coating which does not stick to hot melt adhesive. One end of the fixed plate 82 is formed with a trough 86 for collection of hot melt adhesive as described below.

A carriage 88 is movable with respect to the fixed plate 82 between a start position 90 and a return position 92. See FIGS. 9–14. The carriage 88 comprises a pair of rods 94, 96 each supported by mounts 98 at opposite ends which are carried by the fixed plate 82. A pair of side plates 100, 102 are mounted by bearings 104 to the rods 94, 96, respectively, to permit axial movement of the side plates 100, 102 along the rods 94, 96. A main drive cylinder 105 having a piston 107 collected to one of the side plates 100, 102 is operable to effect movement of the carriage 88 between the start position 90 and the return position 92. Alternatively, other types of drive arrangements could be employed to effect movement of carriage 88 such as motor drives and the like.

Extending transverse to the side plates 100, 102 are a pair of support rods 106, 108 which mount an adhesive gun 110 having an elongated slot nozzle 112 formed with multiple discharge orifices (not shown). The adhesive gun 110 is supplied with foamed or non-foamed melt adhesive from a source 111. Mounted to the forward end of the adhesive gun 110 by a bracket 113 is a cylinder 114 having a piston 116 which carries a scraper blade 118. The cylinder 114 is operable to move piston 116 between a down position in which the scraper blade 118 engages the transfer surface 84 of the fixed plate 82, and a raised position in which the scraper blade 118 is positioned above the fixed plate 82. Other drive arrangements for moving the scraper blade 118 between the down position and raised position could also be employed, such as a motor drive and the like.

The sequence of operation of the adhesive transfer system 80 is illustrated in FIGS. 9–14. Such operation is controlled by a controller 120, similar to the controller 68 described above.

Figure 9:
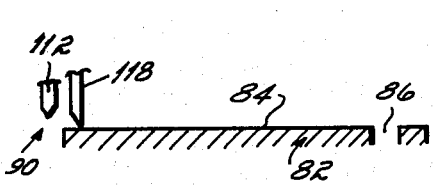
FIGS. 9–14 are schematic views of the sequential operation of the embodiment illustrated in FIG. 3.
Figure 10:
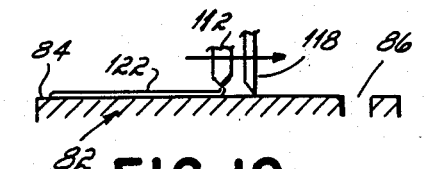
Figure 11:
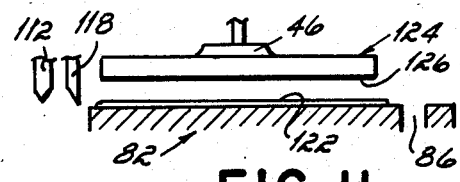
Figure 12:
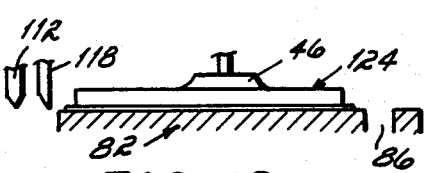
Figure 13:
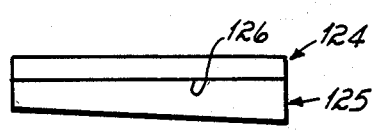
Figure 14:
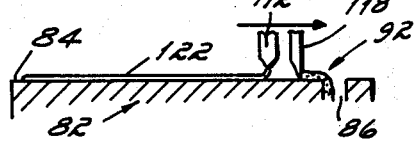

As shown in FIGS. 8 and 9, the controller 120 operates a pressure source 121 to activate the main drive cylinder 105 which extends the piston 107 so that the carriage 88 moves from the start position 90 toward the return position 92. At the same time, the controller 120 signals the source 111 of melt adhesive which supplies the adhesive gun 110. Gun 110 is activated to dispense a layer 122 of adhesive in the desired pattern upon the transfer surface 84 of the fixed plate 82.

Movement of the carriage 88 and operation of the adhesive gun 110 continues until the carriage 88 reaches the return position 92 at which time the adhesive gun 110 is deactivated. The main drive cylinder 105 is then reversed to return the carriage 88 to the start position 90. See FIG. 11. At the same time, a foam section 124 having a parting surface 126 is moved into position above the adhesive layer 122 by an overhead conveyor (not shown). The parting surface 126 of the foam section 124 is then brought into engagement with the adhesive layer 122 so that at least a portion of the adhesive layer 122 adheres thereto. See FIG. 12. The overhead conveyor and associated mechanisms for moving the foam section 124 are identical to that illustrated in FIG. 1, and reference should be made to the discussion above for a description thereof.

After the parting surface 126 of the foam section 124 has received a layer of adhesive and is retracted from the fixed plate 82, the overhead conveyor moves the foam section 124 into engagement with a mating foam section 125. See FIG. 13. The controller 120 then activates the main drive cylinder 105 to again move the carriage 88 from the start position 90 to the return position 92. Since at least some of the adhesive on the transfer surface 84 does not adhere to the mold part 124, the controller 120 also activates a pressure source 125 which operates the cylinder 114 causing its piston 116 to move the scraper blade 118 into engagement with the transfer surface 84. The scraper blade 118 scrapes the remaining adhesive from the transfer surface 84, and pushes it into the trough 86 at the return position 92 of the transfer surface 84 from which it is conveyed to a suitable container (not shown). Trailing behind the scraper blade 118, the adhesive gun 110 lays down a new adhesive layer 122 on the transfer surface 84. The process is then repeated for each foam section 124.

While the invention has been described with reference to a preferred embodiment, it will be understood by those skilled in the art that various changes may be made and equivalents may be substituted for elements thereof without departing from the scope of the invention.

In addition, many modifications may be made to adapt a particular situation or material to the teachings of the invention without departing from the essential scope thereof. For example, the particular construction of the overhead conveyor 36 and cylinder arrangement for supporting the foam sections is but one example of a method for moving the foam sections into contact with the transfer surface for receiving adhesive on their parting surfaces, and then transporting the foam section into engagement with a mating section. Many other types of devices for manipulating the foam sections could be employed to obtain the same result.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for applying hot melt adhesive to a parting surface of a section of a foam pattern used in casting metal parts, comprising:
    a fixed transfer surface;
    applicator means for dispensing hot melt adhesive;
    carriage means for moving said applicator means along said fixed transfer surface so that a predetermined pattern of adhesive corresponding in shape to the parting surface of a section of a foam pattern is applied to said fixed transfer surface;
    means for moving said parting surface of the section of the foam pattern into contact with the layer of hot melt adhesive on said transfer surface so that at least a portion of the hot melt adhesive adheres to the parting surface;
    means for moving said parting surface of said section of the foam pattern into contact with a mating parting surface of another section of the foam pattern.

2. The apparatus of claim 1 further including means for collecting hot melt adhesive removed from said transfer surface.

3. The apparatus of claim 1 in which said carriage means comprises:
    a pair of spaced rods mounted to said fixed transfer surface;
    a pair of side plates each carried by one of said spaced rods, said side plates being movable along said spaced rods relative to said transfer surface;
    support means for mounting said applicator means between said spaced side plates, said applicator means being positioned above said transfer surface and being movable with said side plates therealong.

4. The apparatus of claim 1 further including scraper means for scraping hot melt adhesive from said transfer surface which remains after contact with the parting surface of the section of the foam pattern.

5. Apparatus for applying hot melt adhesive to a parting surface of a section of a foam pattern used in casting metal parts, comprising:
    a transfer surface adapted to conform in shape to the parting surface of a section of a foam pattern;
    fixed applicator means for dispensing hot melt adhesive;
    means for moving said transfer surface relative to said fixed applicator means so that said fixed applicator means dispenses a layer of hot melt adhesive onto said transfer surface in a predetermined pattern corresponding to the shape of the parting surface of the section of a foam pattern;
    means for moving said parting surface of the section of the foam pattern into contact with said layer of hot melt adhesive on said transfer surface so that at least a portion of the hot melt adhesive adheres to the parting surface;
    support means having a support surface formed with substantially the same shape as the parting surface of the section of a foam pattern, said support surface of said support means being mounted beneath said transfer surface for supporting said transfer surface upon contact with the parting surface of the section of a foam pattern;
    means for moving said parting surface of said section of the foam pattern into contact with a mating parting surface of another section of the foam pattern.

6. The apparatus of claim 5 in which said support means comprises a support plate formed with a bottom surface, a top surface and a plurality of throughbores extending between said bottom surface and top surface.

7. The apparatus of claim 6 further including vacuum means communicating with said bottom surface of said support plate for creating a suction at said top surface to move said transfer surface against said top surface of said support plate.

* * * * *